United States Patent
Shinn et al.

(10) Patent No.: US 7,672,038 B2
(45) Date of Patent: Mar. 2, 2010

(54) METHOD AND APPARATUS FOR MANUFACTURING ELECTROPHORETIC DISPLAYS

(75) Inventors: Ted-Hong Shinn, Hsinchu (TW); Tung-Ying Shiue, Hsinchu (TW); Hung-Pin Su, Hsinchu (TW); Jui-Chung Cheng, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 20 days.

(21) Appl. No.: 12/057,416

(22) Filed: Mar. 28, 2008

(65) Prior Publication Data

US 2009/0174927 A1    Jul. 9, 2009

(30) Foreign Application Priority Data

Jan. 4, 2008    (TW) ............... 97100486 A

(51) Int. Cl.
*G02B 26/00* (2006.01)
*G09G 3/34* (2006.01)

(52) U.S. Cl. ...................... 359/296; 345/107

(58) Field of Classification Search ......... 359/290–296; 430/35, 19, 38, 60, 107, 105; 345/107, 105, 345/108; 252/72

See application file for complete search history.

(56) References Cited

U.S. PATENT DOCUMENTS 7,006,063 B2 *    2/2006    Maeda ..................... 345/84
2002/0005824 A1 *    1/2002    Oshitani et al. .............. 345/76

\* cited by examiner

*Primary Examiner*—Mohammed Hasan
(74) *Attorney, Agent, or Firm*—Chun-Ming Shih

(57) ABSTRACT

A method for manufacturing an electrophoretic display includes the steps of: providing a substrate; forming a flexible plate on the substrate; forming an electrophoretic layer on the flexible plate; forming a transparent protection layer on the electrophoretic layer; forming an edge protection member between the flexible plate and the transparent protection member, the edge protection member surrounding the electrophoretic layer; and providing a laser beam to irradiate the flexible plate from a side of the substrate facing away from flexible plate, so as to release the substrate from the flexible plate.

16 Claims, 3 Drawing Sheets

US 7,672,038 B2

METHOD AND APPARATUS FOR MANUFACTURING ELECTROPHORETIC DISPLAYS

BACKGROUND

The invention is related to a reflective display apparatus, especially to a method and an apparatus for manufacturing an electrophoretic display.

An electrophoretic display (EPD) is a reflective display apparatus based on utilizing electrophoretic effect of electriferous particles dispersed in a dielectric solvent. Currently, an electrophoretic display includes a glass substrate, a transparent protection layer opposite to the glass substrate with an interval, and an electrophoretic layer sandwiched between the glass substrate and the transparent protection layer. The electrophoretic display is divided into a passive matrix drive type and an active matrix drive type by driving means. For a passive matrix drive type electrophoretic display, it is necessary to dispose row electrodes and transparent column electrodes on the glass substrate and transparent protection layer. Correspondingly, for an active matrix drive type electrophoretic display, a TFT matrix and a pixel electrode and a transparent plate electrode without pattern are needed to be disposed on the glass substrate and the transparent protection layer, respectively.

Along with a widely used of the electrophoretic display and mostly used on portable devices, it becomes more important to design light-weight and thin-thickness electrophoretic displays. At the present time, a soft electrophoretic display using a flexible plate to replace the glass substrate is respected to be an apparatus which can own all virtues described above and became primary products of the market in future. However, how to improve the manufacturing yield rate and keep preferable reliability as much should be solved desirously.

BRIEF SUMMARY

The present invention is directed to provide a method of manufacturing electrophoretic display which can increase the manufacturing quality and improve the electrophoretic display reliablity to achieve product commerce.

The present invention is directed to provide an apparatus for manufacturing electrophoretic display which can increase the manufacturing quality and improve the electrophoretic display reliability to achieve product commerce.

According to an embodiment of the present invention, a method of manufacturing an electrophoretic display is provided. The method includes steps of:

providing a substrate;

providing a flexible plate disposed on the substrate;

providing an electrophoretic layer disposed on the flexible plate;

providing a transparent protection layer disposed on the electrophoretic layer;

providing an edge protection member disposed between the flexible plate and the transparent protection layer to surround the electrophoretic layer; and providing a laser to irradiate the flexible plate from a side of the substrate without the flexible plate being disposed, so as to separate the substrate from the flexible plate.

According to another embodiment of the present invention, an apparatus of manufacturing an electrophoretic display is provided, which is used to separate a substrate from an electrophoretic display, the electrophoretic display including:

a flexible plate disposed on a substrate;

an electrophoretic layer disposed on the flexible plate;

a transparent protection layer disposed on the electrophoretic layer; and an edge protection member disposed between the flexible plate and the transparent protection layer to surround the electrophoretic layer, an apparatus of manufacturing the electrophoretic display, which is used to separate the substrate from the electrophoretic display, the manufacturing apparatus comprising:

a transmission device for transmitting the electrophoretic display;

an adsorption device for fixing the electrophoretic display with the substrate transmitted by the transmission device by means of adsorption;

a laser device for generating a laser to irradiate the flexible plate from a side of the substrate without the flexible plate being disposed, so as to separate the substrate from the electrophoretic display; and a positioning system for detecting a position of the electrophoretic display in order to adjust the laser device.

The apparatus of manufacturing an electrophoretic display further includes:

a storage device used to store the electrophoretic display; and a recycling device used to store the substrate separated from the electrophoretic display.

According to the embodiments of the invention, separating substrate and flexible plate by laser would not damage the flexible plate and also increase the manufacturing quality of the electrophoretic display. Moreover, the electrophoretic layer can be protected by the edge protection member surrounding the electrophoretic layer and improve the electrophoretic display reliablity to achieve product commerce.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
FIG. 1 is a cross sectional, schematic view of a substrate according to an embodiment of present invention.
Figure 8:
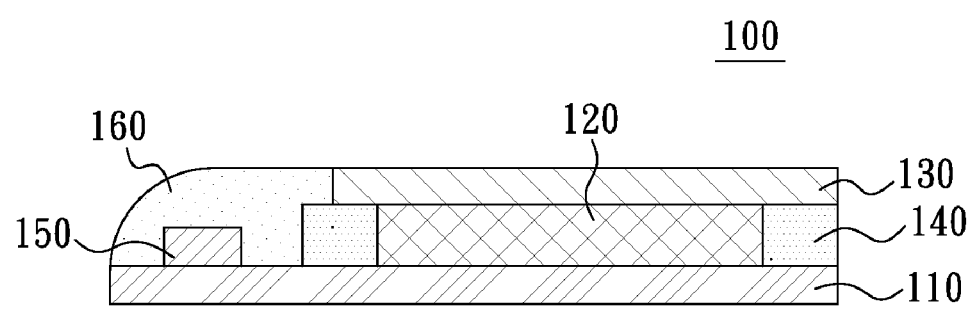
FIG. 8 is a cross sectional, schematic view of an electrophoretic display separated from the substrate of FIG. 7.

Referring to FIG. 1 and FIG. 8, a method for manufacturing an electrophoretic display 100 is provided according to an embodiment of the invention. The method includes steps as follows.

As shown in FIG. 1, a substrate 200 is provided, which can be a glass substrate, metal substrate, steel substrate or other rigid material substrates.

Figure 2:
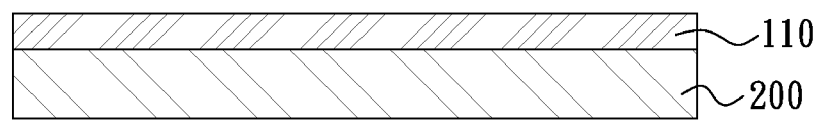
FIG. 2 is a cross sectional, schematic view of a flexible plate on the substrate of FIG. 1.

As shown in FIG. 2, a flexible plate 110 is disposed on the substrate 200. The material of the flexible plate 110 can be plastic, preferably to be polyimide (PI), polyethylene terephthalate (PET), polyethersulfone (PES), or polycarbonate (PC). The flexible plate 110 is convenient to be separated from the glass substrate 200 by radiated using invisible laser, such as UV laser whose wavelength is in a range of 300 nm to 400 nm. The required circuits and a first driving electrode (not shown in FIG. 2) are disposed on the flexible plate 110.

Figure 3:
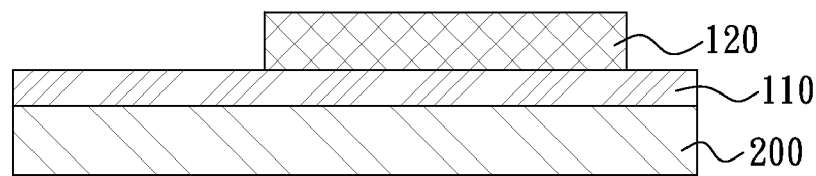
FIG. 3 is a cross sectional, schematic view of an electrophoretic layer on the flexible plate of FIG. 2.

As shown in FIG. 3, an electrophoretic layer 120 is disposed on the flexible plate 110. The electrophoretic layer 120 includes a dielectric solvent and electriferous particles dispersed in the dielectric solvent.

Figure 4:
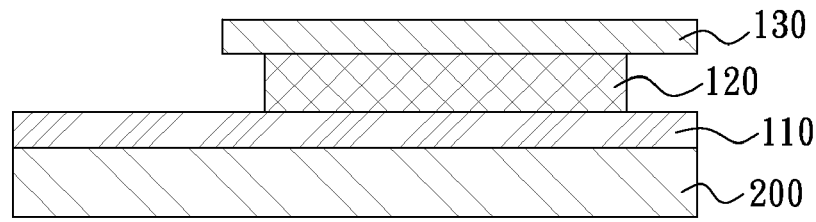
FIG. 4 is a cross sectional, schematic view of a transparent protection layer on the electrophoretic layer of FIG. 3.

As shown in FIG. 4, a transparent protection layer 130 is disposed on the electrophoretic layer 120. The material of the transparent protection layer 130 can be transparent plastic. A second driving electrode (not shown in FIG. 4) is disposed on the electrophoretic layer 120 adjacent to the transparent protection layer 130 (between the transparent protection layer 130 and the electrophoretic layer 120). The second driving electrode is a transparent electrode, such as an Indium Tin Oxide (ITO) electrode, and matches with the first driving electrode on the flexible plate 110. Illuminated in detail, when a passive matrix drive type electrophoretic display 100 is manufactured, the first driving electrode on the flexible plate 110 and the second driving electrode on the transparent protection layer 130 are row electrode and transparent column electrode respectively. On the contrary, to an active matrix drive type electrophoretic display 100, the first driving electrode on the flexible plate 110 and the second driving electrode on the transparent protection layer 130 are pixel electrode and transparent plate electrode without pattern, respectively, and an active device matrix, such as a thin film transistor (TFT) matrix, is arranged on the flexible plate 110 to electrically connect to the pixel electrode.

Figure 5:
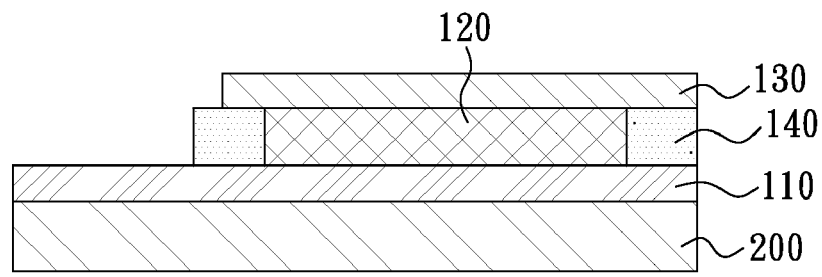
FIG. 5 is a cross sectional, schematic view of an edge protection member disposed between the transparent protection layer and the flexible plate of FIG. 4.

As shown in FIG. 5, an edge protection member 140 is disposed between the flexible plate 110 and the transparent protection layer 130 to surround the electrophoretic layer 120. The material of the edge protection member 140 can be resin material, such as Phenoxy Resin.

Figure 6:
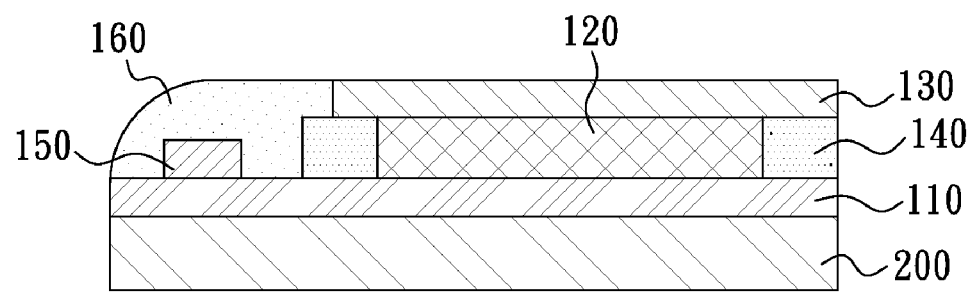
FIG. 6 is a cross sectional, schematic view of a driving IC on the flexible plate and an edge protection member covering the driving IC of FIG. 5.

As shown in FIG. 6, a driving integrated circuit (IC) 150 and an edge reinforcement member 160 are provided. The driving IC 150 in juxtaposition with the electrophoretic layer 120 are disposed on the flexible plate 110 and connect electrically to the circuits and the first driving electrode on the flexible plate 110. The driving IC 150 can be a chip on glass (COG) module. The edge reinforcement member 160 covers the driving IC 150 and connects to the transparent protection layer 130 to protect the driving IC 150. The material of the edge reinforcement member 160 can be plastic material, such as UV polymeric gel, silica gel, or polyurethane (PU). Of course, the driving IC 150 is not limited to be disposed on the flexible plate 110, and also can be a driving control module (not shown in FIG. 6) independent to the electrophoretic display 100.

Figure 7:
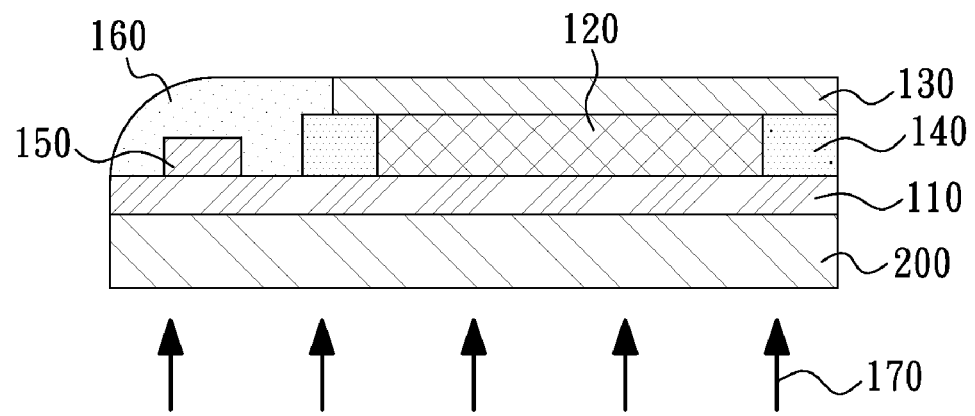
FIG. 7 is a schematic view of a laser to irradiate the flexible plate from a side of the substrate without the flexible plate being disposed of FIG. 6.

As shown in FIG. 7, a laser 170 is provided to irradiate the flexible plate 110 from a side of the substrate 200 without the flexible plate 110 being disposed, so as to separate the substrate 200 from the flexible plate 110. A wavelength of the laser 170 is in a range of 300 nm to 400 nm and a pulse energy is in a range of 250 to 700 mJ. The energy provided by the laser 170 can break the juncture between the flexible plate 110 and the substrate 200 and separate the substrate 200.

FIG. 7 shows a cross sectional, schematic view of the electrophoretic display 100 separated from the substrate 200 by laser.

Figure 9:
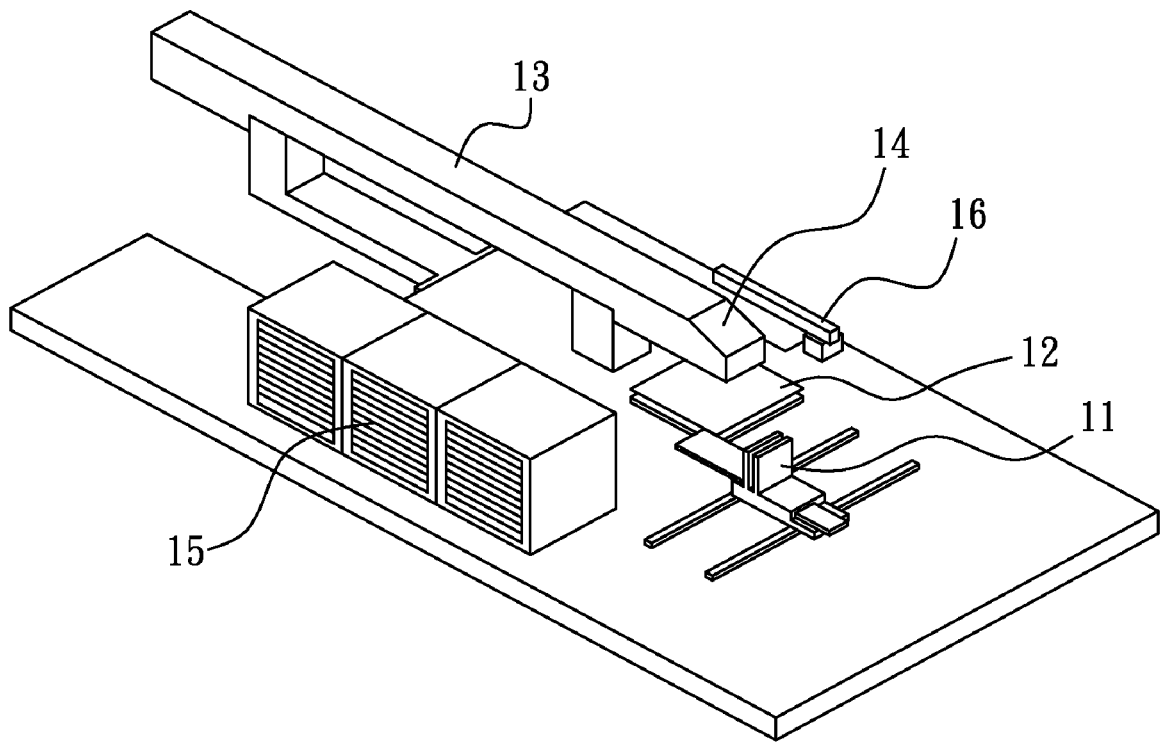
FIG. 9 is a cross sectional, schematic view of an apparatus for manufacturing an electrophoretic display according to an embodiment of present invention.

As shown in FIG. 9, an apparatus 10 for manufacturing the electrophoretic display 100 is provided according to another embodiment. The apparatus 10 includes a mechanical arm 11, an adsorption device 12, a laser device 13, a positioning system 14, a storage device 15 and a recycling device 16.

The mechanical arm 11 transmits the electrophoretic display and the substrate 200 separated of FIG. 6 and the electrophoretic display 100 of FIG. 8. But it is not limit to the mechanical arm 11, and all other transmission devices which can transmit electrophoretic display can be available. The mechanical arm 11 can be driven by a cylinder motor and capable of being rotated by 90 degree.

Using means of vacuum adsorption, the adsorption device 12 can fix the electrophoretic display with the substrate 200 transmitted by the mechanical arm 11 of FIG. 6. But it is not limit to the adsorption device 12, and all other adsorption devices can be available.

The laser device 13 can generate a laser 170 to irradiate the flexible plate 110 with the substrate 200 from a side of the substrate 200 without the flexible plate 110 fixed by the adsorption device 12 in FIG. 7, so as to separate the substrate 200 from the electrophoretic display. A wavelength of the laser 170 from the laser device 13 can be in a range of 300 nm to 400 nm and a pulse energy of the laser 170 is in a range of 250 to 700 mJ.

The positioning system 14 is used to detect the position of the flexible plate 110 with the substrate 200 transmitted by the laser device 13 and mechanical arm 11 of FIG. 6 in order to adjust the position. The positioning system 14 can be a charge coupled device (CCD) positioning system.

The storage device 15 is used to store the electrophoretic display with the substrate 200 of FIG. 6 and the electrophoretic display 100 separated of FIG. 8.

The recycling device 16 which can be a substrate placement device is used to store the substrate 200 separated.

As described above, according to the embodiments of the invention, separating substrate and flexible plate by laser would not damage the flexible plate and also increase the manufacturing quality of the electrophoretic display. Moreover, the electrophoretic layer can be protected by the edge protection member surrounding the electrophoretic layer and improve the electrophoretic display reliablity to achieve product commerce.

Of course, the material of the substrate 200, flexible plate 110, edge protection member 140 and the wavelength or the pulse energy of laser can be changed according to the invention.

What is claimed is:

1. A method of manufacturing an electrophoretic display, comprising steps of:
   providing a substrate;
   providing a flexible plate disposed on the substrate;
   providing an electrophoretic layer disposed on the flexible plate;
   providing a transparent protection layer disposed on the electrophoretic layer;
   providing an edge protection member disposed between the flexible plate and the transparent protection layer and surrounding the electrophoretic layer; and
   providing a laser to irradiate the flexible plate from a side of the substrate without the flexible plate being disposed, and thereby the substrate is separated from the flexible plate resulting from the laser irradiation.

2. The method of manufacturing an electrophoretic display according to claim 1, wherein between the steps of providing an edge protection member and providing a laser, further comprising steps of:
  providing a driving integrated circuit (IC) in juxtaposition with the electrophoretic layer being disposed on the flexible plate; and
  providing an edge reinforcement member to cover the driving IC and connect to the transparent protection layer.

3. The method of manufacturing an electrophoretic display according to claim 2, wherein the driving IC is a chip on glass (COG) module.

4. The method of manufacturing an electrophoretic display according to claim 1, wherein the material of the flexible plate is plastic, polyimide (PI), polyethylene terephthalate (PET), polyethersulfone (PES), or polycarbonate (PC).

5. The method of manufacturing an electrophoretic display according to claim 1, wherein a wavelength of the laser is in a range of 300 nm to 400 nm.

6. The method of manufacturing an electrophoretic display according to claim 1, wherein a pulse energy of the laser is in a range of 250 to 700 mJ.

7. The method of manufacturing an electrophoretic display according to claim 1, wherein the substrate is a glass substrate, a metal substrate or a steel material substrate.

8. An electrophoretic display comprising:
  a flexible plate disposed on a substrate;
  an electrophoretic layer disposed on the flexible plate;
  a transparent protection layer disposed on the electrophoretic layer; and
  an edge protection member disposed between the flexible plate and the transparent protection layer to surround the electrophoretic layer,
  an apparatus of manufacturing the electrophoretic display, which is used to separate the substrate from the electrophoretic display, the manufacturing apparatus comprising:
    a transmission device for transmitting the electrophoretic display;
    an adsorption device for fixing the electrophoretic display with the substrate transmitted by the transmission device by means of adsorption;
    a laser device for generating a laser to irradiate the flexible plate from a side of the substrate without the flexible plate being disposed, so as to separate the substrate from the electrophoretic display; and
    a positioning system for detecting a position of the electrophoretic display in order to adjust the laser device.

9. The apparatus of manufacturing an electrophoretic display according to claim 8, further comprising:
  a storage device used to store the electrophoretic display; and
  a recycling device used to store the substrate separated from the electrophoretic display.

10. The apparatus of manufacturing an electrophoretic display according to claim 8, wherein the transmission device is a mechanical arm.

11. The apparatus of manufacturing an electrophoretic display according to claim 10, wherein the mechanical arm is driven by a cylinder motor and capable of being rotated by 90 degree.

12. The apparatus of manufacturing an electrophoretic display according to claim 8, wherein the adsorption device is an adsorption device to fix the electrophoretic display with the substrate transmitted by the transmission device by means of vacuum adsorption.

13. The apparatus of manufacturing an electrophoretic display according to claim 8, wherein a wavelength of the laser generated by the laser device is in a range of 300 nm to 400 nm.

14. The apparatus of manufacturing an electrophoretic display according to claim 8, wherein a pulse energy of the laser generated by the laser device is in a range of 250 to 700 mJ.

15. The apparatus of manufacturing an electrophoretic display according to claim 8, wherein the positioning system includes a charge coupled device(CCD).

16. The apparatus of manufacturing an electrophoretic display according to claim 8, wherein the substrate is a glass substrate, a metal substrate or a steel material substrate.

* * * * *